Sept. 29, 1925.  
W. J. MEINEL  
BEADING MACHINE  
Filed July 31, 1920

Witness:
R. H. Schleicher

Inventor
William J. Meinel,
By Chs. Desjardins
Attorney

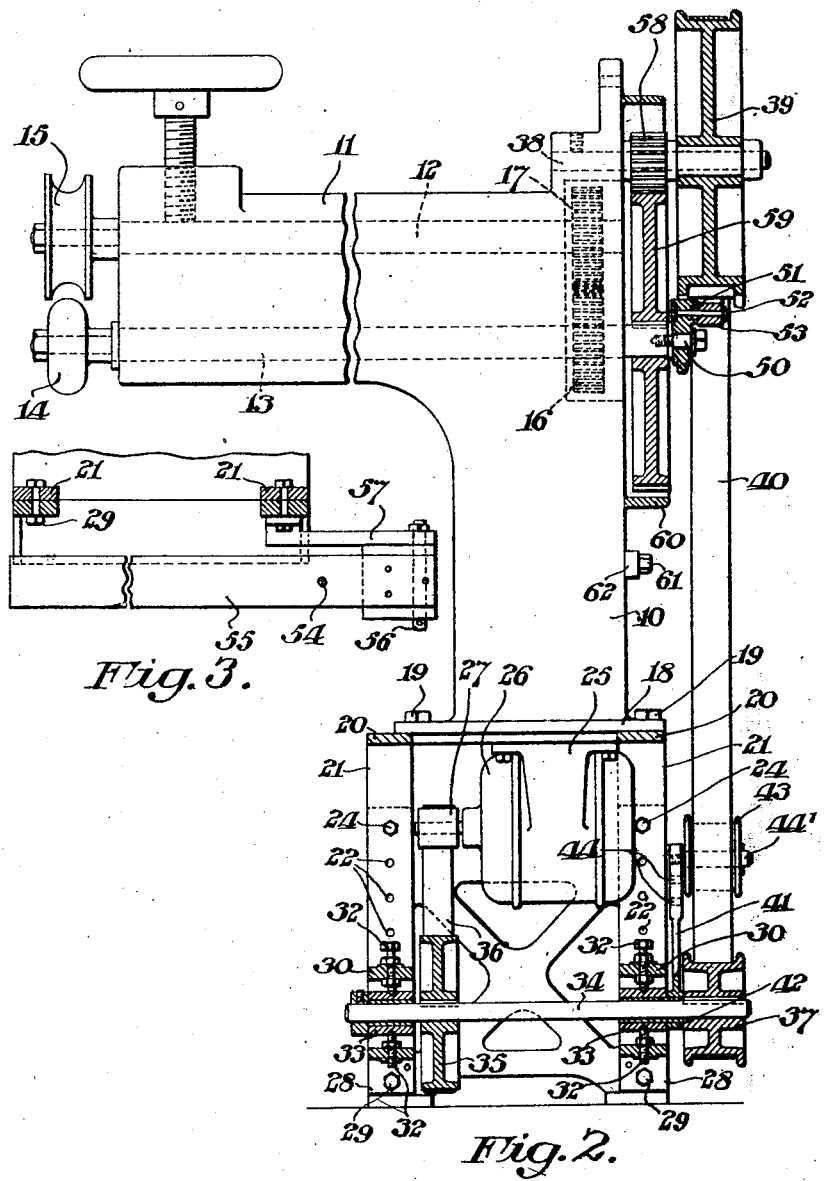

Patented Sept. 29, 1925.

1,555,427

UNITED STATES PATENT OFFICE.

WILLIAM J. MEINEL, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

BEADING MACHINE.

Application filed July 31, 1920. Serial No. 400,381.

*To all whom it may concern:*

Be it known that I, WILLIAM J. MEINEL, residing at Philadelphia, county of Philadelphia, State of Pennsylvania, have invented certain new and useful Improvements in a Beading Machine, of which I declare the following to be a full, clear, and exact description.

This invention relates to beading machines, and more particularly to machines of this nature employed in sheet metal work for a variety of purposes, such, for example, as forming a bead along the edge of a sheet metal plate or panel.

The object of the invention is to provide a beading machine of this nature which is simple in structure and efficient in operation.

A further object is to provide a machine of the class referred to which is self-contained and mobile, so that it can be easily shifted from one point to another in the factory or plant.

A further object is to provide a machine of the nature referred to wherein the beading devices are power actuated through suitable drive connections to a driving motor, the beading devices being mounted in the upper part of the supporting framework, and the motor in the lower or base portion of such framework.

A further object is to provide a beading machine of the nature referred to which is capable of being adjusted as to height to accommodate different classes or conditions of work.

Other objects of the invention will appear more fully hereinafter.

The invention consists substantially in the construction, combination, location, and relative arrangement of parts, all as will be more fully hereinafter set forth, as illustrated in the accompanying drawings, and finally pointed out in the appended claims.

Referring to the accompanying drawings,—

Fig. 2 is a view in vertical section on the line 2—2, Fig. 1, looking in the direction of the arrows.

Fig. 3 is a broken detail view in section on the line 3—3, Fig. 1, looking in the direction of the arrows.

The same part is designated by the same reference numeral wherever it occurs throughout the several views.

Figure 1:
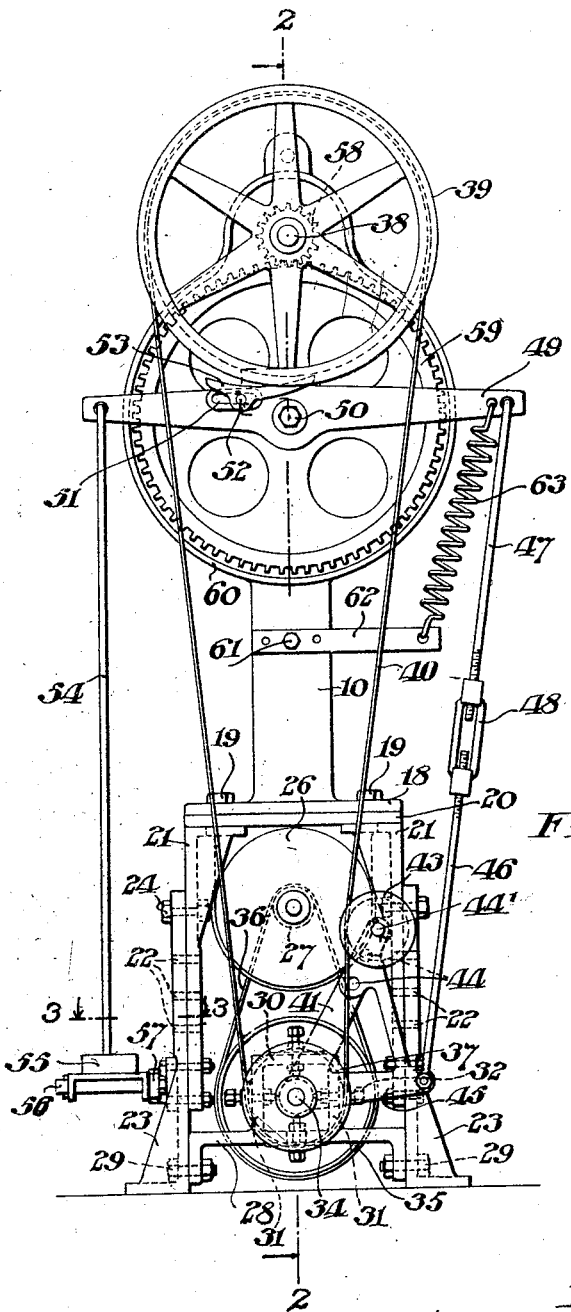
Fig. 1 is a view in end elevation of a machine embodying the principles of my invention.

In the manufacture of various structures out of sheet metal it is frequently desirable to form a bead along the edge of the metal sheet or panel. For example, in the manufacture of automobile bodies it is customary to form a bead along the upper edge of the tonneau and other parts of such body. The stampings or panels employed in such work are often heavy, bulky and cumbersome to handle, and therefore it is desirable, in machines employed to form the edge beads therein, to afford ample space for the handling and manipulation of the stamping in properly presenting the edge thereof to the bead forming devices. Moreover, where the beading devices are power driven, it is desirable to so relatively mount the beading devices and the motor which drives such devices as to enable the entire machine to be readily and easily shifted bodily from place to place in the factory or shop, and in securing this result it is important to maintain stability of the structure, and therefore it is desirable that the motor and other heavy parts of the machine and driving connections be mounted in the lower part or base of the machine frame while the beading devices are mounted or carried in the upper part of the frame, thereby bringing the center of gravity of the entire structure as low as possible.

Again, in machines of this character, it is desirable to provide simple and efficient means to adjust the height at which the beading operation is accomplished so as to accommodate various characters and conditions of work, and the convenience of the workmen engaged in the work.

It is among the special purposes of my present invention to provide means in a beading machine which secure and attain these and other desirable objects and purposes.

It is also among the special purposes of my present invention to employ a drive connection between the motor and the beading devices which permits and accommodates itself to the height adjustment of the beading devices.

In carrying out my invention I provide a suitable framework in the upper part of which the beading devices are mounted. In the particular form shown, to which, however, my invention is not to be limited or restricted, the beading devices comprise complementary rolls 14, 15. These beading devices are power driven from a motor, indicated at 26, which, in accordance with my invention is mounted in the lower portion or base of the frame work. In the particular form shown, to which, however, my invention is not to be limited or restricted, the supporting framework includes a vertical standard 10, the base 18 of which rests upon and, if desired, is secured by bolts 19, or otherwise, to a frame 20, having depending legs 21 which are vertically adjustable with reference to vertically extending portions carried by or forming part of supporting feet 23, which carry the entire structure. The frame 20 may be adjusted vertically with reference to the supporting feet, and maintained in its adjusted position in many specifically different ways. In the illustrative arrangement shown, bolts indicated at 24 may serve the purpose of maintaining these parts in their adjusted position, said bolts being received in one or another pair of registering holes 22. With this arrangement a desirable vertical adjustment of the height at which the beading devices operate may be secured.

The frame 20 and supporting feet 23 and their connections constitute the lower or base portion of the apparatus, and the motor 26 may be mounted in this base portion in any suitable or convenient manner. In the illustrative form shown, the motor 26 is carried by a cradle 25 which depends from the base frame member 20.

Any suitable drive connections from the motor to the beading devices may be employed, which, however, must be of such nature as to permit of easy control, and which also readily accommodates itself to the adjustment as to height of the beading devices. In the particular form shown, to which, however, my invention is not to be limited or restricted, the shaft of the motor is operatively connected to a drive shaft 34, through a belt connection 36, engaging over pulleys 27 and 35, respectively carried by said shafts. The shaft 34 is operatively connected to a pulley 39 by means of a belt 40, which operates over a pulley 37, on the drive shaft 34. The shaft 34 is journaled in boxes 33, adjustably mounted in cross members or bridges 28, secured to the supporting feet 23, as, for example, by means of bolts 29. The adjustment of the journal boxes may be attained in many ways. A simple arrangement is shown wherein adjusting screws 32 passing through the bridge members 28, and the arching portions 30, 31, thereof, engage the said boxes.

The pulley 39 is journaled upon the extended hub of a pinion 58 which is carried upon a stub shaft 38, mounted in the upper part of the framework. This pinion meshes with and drives a gear wheel 59 mounted upon one end of a shaft 13 of one of the beading rolls located at the other end of said shaft. This shaft 13, drives the shaft 12 of the cooperating beading roll through the intermeshing gears 16, 17, respectively mounted on said bearing roll shafts. The shafts 12, 13, are mounted in this instance, in a bead portion 11 of the framework, which extends away from the gearing connections referred to and overhangs the base portion of the frame. This arrangement affords ample clearance space and room for large bulky and cumbersome stampings to be conveniently manipulated with reference to the beading devices during the beading operations.

It is desirable to so control the driving connections between the motor and the beading devices as to enable the latter to be started and stopped at will without stopping the motor. This may be accomplished in many different ways. A simple arrangement is shown, to which, however, my invention is not to be limited or restricted, wherein I provide a belt tightener for the drive belt 40 and a brake shoe for the pulley 39, and I so mount, arrange and connect said belt tightener and brake shoe as to secure cooperative action thereof. In the arrangement shown, a belt tightener pulley 43 is mounted on a stud 44' mounted in one arm of a bell crank lever 41, pivotally mounted at its angle upon the shaft 34, as indicated at 42. This pulley 43 is arranged to be thrown against or withdrawn from the belt 40. If desired, the distance of the pulley 43 from the axis about which the bell crank 41 rocks may be varied, and this may be accomplished in various ways. A simple arrangement is shown wherein the stud 44', which carries said pulley may be removably mounted in any one of the holes 44, in the arm of the bell crank lever 41.

The brake shoe for action against the pulley 39 is indicated at 53, and is carried by a pin 52, which is mounted in a slot 51 in a lever 49, fulcrumed to rock upon a stub 50 mounted in the end of shaft 13. To one end of this lever a foot treadle 55 is connected by means of a rod 54. The foot treadle is pivotally connected to the base frame in convenient position to be depressed by an attendant when it is desired to cause the beading devices to be operated. A simple mounting for the foot treadle is shown wherein said treadle is journaled at one end upon a pin 56 mounted in the end of an arm 57 which is secured to the base frame of the machine. The other end of the lever 49 is connected to one arm of the bell crank lever 41. In order to secure a desirable adjustment of this connection I employ rods 46, 47, respectively connected to the bell crank lever 41, and to lever 49, and which rods are connected together by a turn buckle connection indicated at 48.

A tension is applied to the lever 49, tending, normally, to rock said lever in a direction to apply the brake shoe 53, to wheel 39, and to withdraw the belt tightener pulley 43 from pressure contact with the belt 40. Various arrangements for accomplishing this result may be employed. A simple arrangement is shown wherein a spring 63 is connected at one end to lever 49 and at the other end to an arm 62 suitably mounted on and secured to the standard 10, as indicated at 61.

If desired, an annular flange 60 may be mounted on the frame and arranged to form a housing for the gears 58, 59.

It is believed the operation of the machine will be fully understood as it is very simple. The edge of the panel or stamping to be beaded is inserted between the beading rolls 14, 15, and the foot treadle 55 is then depressed. This causes the brake shoe to be released from pulley 39, and the bell crank lever 41 to be rocked in a direction to cause the belt tightener pulley to be pressed against the belt 40, thereby tightening the latter and causing it to transmit driving power from the motor to the shafts which carry the beading rolls. The work is then manipulated and guided by the machine attendants so as to properly present the edge thereof to the action of the beading rolls. When the foot treadle is released the spring 63 causes the lever 49 to be rocked, thereby applying the brake shoe and releasing the belt tightener from pressure bearing against the belt 40, and the operation of the beading rolls is instantly arrested. When it is desired to adjust the height of the beading devices the members 20, 21, of the base frame are adjusted vertically until the desired height adjustment is attained, and these parts are then secured in their adjustment upon the base portions 23. The relative variations in the distances apart of the shafts 34 and 38, and of shafts 34 and the motor shaft, resulting from the height adjustments described may be compensated in the driving connections intermediate said shafts in various ways. For instance, the adjustment of the belt tightener pulley 43 upon the bell crank lever 41 may be employed to vary the tensioning effect upon belt 40, or said belt and also belt 36, may be replaced by belts of the required length for each adjustment.

It will be seen that I provide an exceedingly simple, self contained, shiftable and adjustable beading mechanism wherein the objects and purposes of my invention are attained.

It is to be understood that many variations and changes in details might readily occur to persons skilled in the art without departure from the spirit and scope of my invention. I do not desire, therefore, to be limited or restricted to the details shown and described.

Having thus described my invention, what I claim as new and desire to secure by Letters Patent is:—

1. A machine of the class described comprising the combination of a standard, a head carried thereby, a pair of shafts journaled in said head and each carrying a beading roll, a base carrying said standard and adjustable in height, a motor carried in said base, and driving connections between said motor and said shafts.

2. A machine of the class described, comprising the combination of a standard, a head carried thereby, a pair of beading roll shafts journaled in said head and each carrying a beading roll, an adjustable base comprising upper and lower members adjustable relative to each other, the upper member carrying said standard, a motor carried by said upper member, a shaft journaled in said lower member and driven by said motor, and driving connections between said shafts and said beading roll shafts.

3. The combination with a beading machine comprising a standard, a head carried thereby, and a pair of beading roll shafts journaled in said head and each carrying a beading roll, of a base member supporting said standard and having downwardly extending portions, foot-members adjustably connected to said downwardly extending portions, a motor carried by said base member, and driving connections between said motor and said shafts.

4. The combination with a beading machine comprising a standard, a head carried thereby, and a pair of beading roll shafts journaled in said head and each carrying a beading roll, of a base member supporting said standard and having downwardly extending portions, foot members adjustably connected to said downwardly extending portions, a motor carried by said base member, a shaft journaled in said foot members and driven by said motor, and driving connections between said shaft and the beading roll shafts.

5. The combination with a beading machine comprising a standard, a head carried thereby, and a pair of beading roll shafts journaled in said head and each carrying a beading roll, of a base member supporting said standard and having downwardly extending portions, foot members adjustably secured to said downwardly extending portions, a pair of bridges connecting and secured to said foot members, a shaft journaled in said bridges, a motor carried by said base member and driving said shaft, and driving connections between said shaft and the beading roll shafts.

6. The combination with a beading machine comprising a standard, a head carried thereby, and a pair of beading roll shafts journaled in said head, and each carrying a beading roll, of a base member supporting said standard, a drive pulley journaled on said head and driving said beading roll shafts, a driving shaft journaled in said base member, pulleys mounted at opposite ends of said last-mentioned shaft, a motor mounted in said base member, a belt connecting said motor and the pulley at one end of said base member shaft, a belt connecting the pulley at the other end of said base member shaft to the drive pulley on the head, a lever fulcrumed upon said base member shaft, a belt tensioning member carried by said lever, and means to rock said lever on its fulcrum.

7. The combination with a beading machine comprising a standard, a head carried thereby, and a pair of beading roll shafts journaled in said head and each carrying a beading roll, of a lever pivotally mounted on said head, a drive pulley journaled on said head and connected to drive said beading roll shafts, driving connections for said drive pulley including a belt, a brake-shoe mounted on said lever, a suitably fulcrumed belt-tensioning lever, an idler pulley adjustably carried by said lever and adapted to engage the belt, adjustable connections between said belt-tensioning lever and said first-named lever, and means for actuating the latter.

8. A machine of the class described comprising the combination of a standard, a head carried thereby, an adjustable base supporting said standard, beading mechanism carried by said head, a motor and a power transmission device mounted in said base, and driving connections between said motor and said beading mechanism.

9. In a beading machine, a supporting base, means to vertically adjust the same, a standard mounted and vertically adjustable therewith, beading devices carried by the standard, a power transmission device and a motor mounted in the supporting base, and driving connections intermediate the power transmission device and motor, and beading devices for actuating the latter.

10. The combination with a beading machine comprising a standard, of beading mechanism carried by the upper portion of said standard, a drive pulley for driving said beading mechanism journaled at the upper end of said standard, a drive shaft journaled in the lower portion of the standard, a motor and a power transmission device carried by said standard and operatively connected to said drive shaft, a belt connecting drive shaft and pulley, a brake acting on said pulley, a brake-actuating lever pivoted on the upper portion of the standard, a belt-tensioning lever fulcrumed on the lower portion of the standard, and a common means for actuating said levers.

In testimony whereof, I affix my signature.

WILLIAM J. MEINEL.